(12) United States Patent
Aoki et al.

(10) Patent No.: US 7,483,636 B2
(45) Date of Patent: Jan. 27, 2009

(54) OPTICAL NETWORK WITH SUB-BAND REJECTION AND BYPASS

(75) Inventors: Yasuhiko Aoki, Richardson, TX (US); Susumu Kinoshita, Plano, TX (US)

(73) Assignee: Fujitsu Limited, Kawasaki (JP)

( * ) Notice: Subject to any disclaimer, the term of this patent is extended or adjusted under 35 U.S.C. 154(b) by 902 days.

(21) Appl. No.: 10/629,021

(22) Filed: Jul. 28, 2003

(65) Prior Publication Data

US 2005/0025490 A1 Feb. 3, 2005

(51) Int. Cl.
*H04J 14/02* (2006.01)
(52) U.S. Cl. .................................................. 398/83
(58) Field of Classification Search ............ 398/34, 398/43–45, 63, 83, 85
See application file for complete search history.

(56) References Cited

U.S. PATENT DOCUMENTS

| | | | |
|---|---|---|---|
| 5,000,531 A | 3/1991 | Burberry | 350/96.16 |
| 5,483,372 A | 1/1996 | Green, Jr. | 359/173 |
| 5,726,785 A | 3/1998 | Chawki et al. | 359/130 |
| 5,751,454 A | 5/1998 | MacDonald et al. | 359/119 |
| 5,771,112 A | 6/1998 | Hamel et al. | 359/128 |
| 5,774,606 A | 6/1998 | de Barros et al. | 385/24 |
| 5,778,118 A | 7/1998 | Sridhar | 385/24 |
| 5,903,371 A | 5/1999 | Arecco et al. | 359/119 |
| 5,943,150 A | 8/1999 | Deri et al. | |
| 5,956,319 A | 9/1999 | Meli | 370/224 |
| 5,986,783 A | 11/1999 | Sharma et al. | |
| 5,999,291 A | 12/1999 | Anderson | 359/133 |
| 6,002,503 A | 12/1999 | Misrahi | |
| 6,025,941 A | 2/2000 | Srivastava et al. | |
| 6,035,080 A | 3/2000 | Henry et al. | 385/24 |
| 6,084,694 A | 7/2000 | Milton et al. | 359/124 |

(Continued)

FOREIGN PATENT DOCUMENTS

EP 0 789 432 8/1997

(Continued)

OTHER PUBLICATIONS

Notification of Transmittal of the International Search Report or the Declaration (PCT Rule 44.1) mailed May 3, 2006, re International Application No. PCT/US2004/016826.2, 4 pages.

(Continued)

*Primary Examiner*—Dzung Tran
(74) *Attorney, Agent, or Firm*—Baker Botts L.L.P.

(57) ABSTRACT

A method of transporting traffic on an optical ring includes, at one or more nodes coupled to the optical ring, splitting an incoming signal (including traffic in a plurality of sub-bands) into a first signal and a second signal. The first signal includes the traffic in a first sub-band of traffic channels and the second signal includes the traffic in the remaining sub-bands of traffic channels of the incoming signal. The method also includes receiving the traffic in the first sub-band at a bypass element, rejecting the traffic in a first portion of the first sub-band at the bypass element, and forwarding the traffic in a second portion of the first sub-band at the bypass element. In addition the method includes, combining the traffic in the second signal with the traffic in the second portion of the first sub-band for transport on the network.

19 Claims, 8 Drawing Sheets

U.S. PATENT DOCUMENTS

| | | | | |
|---|---|---|---|---|
| 6,160,648 | A | 12/2000 | Öberg et al. | 359/110 |
| 6,163,527 | A | 12/2000 | Ester et al. | 370/228 |
| 6,192,173 | B1 | 2/2001 | Solheim et al. | 385/24 |
| 6,198,556 | B1 | 3/2001 | Mizrahi | 359/124 |
| 6,249,510 | B1 | 6/2001 | Thompson | 370/223 |
| 6,285,479 | B1 | 9/2001 | Okazaki et al. | 359/133 |
| 6,288,811 | B1 | 9/2001 | Jiang et al. | 359/127 |
| 6,301,404 | B1 | 10/2001 | Yoneyama | 385/24 |
| 6,337,755 | B1 | 1/2002 | Cao | 359/176 |
| 6,339,495 | B1 | 1/2002 | Cowle et al. | |
| 6,348,984 | B1 | 2/2002 | Mizrahi | 359/124 |
| 6,400,476 | B1 | 6/2002 | Arecco | 359/110 |
| 6,426,815 | B1 | 7/2002 | Koehler | |
| 6,429,974 | B1 * | 8/2002 | Thomas et al. | 359/618 |
| 6,456,406 | B1 | 9/2002 | Arecco et al. | 359/119 |
| 6,456,407 | B1 | 9/2002 | Tammela et al. | 359/119 |
| 6,466,341 | B1 | 10/2002 | Lumish et al. | 359/127 |
| 6,519,064 | B1 | 2/2003 | Fatehi et al. | 359/130 |
| 6,590,681 | B1 | 7/2003 | Egnell et al. | 359/127 |
| 6,868,201 | B1 | 3/2005 | Johnson et al. | |
| 2001/0007509 | A1 | 7/2001 | Aso et al. | 359/326 |
| 2001/0017958 | A1 | 8/2001 | Solheim et al. | 385/24 |
| 2001/0038472 | A1 | 11/2001 | Lee et al. | 359/110 |
| 2002/0034358 | A1 | 3/2002 | Persson | 385/24 |
| 2002/0039212 | A1 | 4/2002 | Lee et al. | 359/127 |
| 2002/0039213 | A1 | 4/2002 | Duerksen | 359/127 |
| 2002/0067523 | A1 | 6/2002 | Way | 359/119 |
| 2002/0145779 | A1 | 10/2002 | Strasser et al. | 359/124 |
| 2002/0149817 | A1 | 10/2002 | Kiliccote et al. | 359/119 |
| 2002/0150328 | A1 | 10/2002 | Morgan et al. | |
| 2003/0002104 | A1 * | 1/2003 | Caroli et al. | 359/127 |
| 2003/0025961 | A1 | 2/2003 | Way | 359/119 |
| 2003/0091274 | A1 | 5/2003 | Vohra et al. | 385/24 |
| 2003/0128985 | A1 * | 7/2003 | Elbers et al. | 398/83 |
| 2003/0215238 | A1 * | 11/2003 | Milton et al. | 398/83 |
| 2004/0052530 | A1 | 3/2004 | Tian et al. | |
| 2004/0114929 | A1 * | 6/2004 | Madsen | 398/79 |

FOREIGN PATENT DOCUMENTS

| | | |
|---|---|---|
| EP | 0 905 803 | 3/1999 |
| EP | 0 920 153 A2 | 6/1999 |
| EP | 0 949 777 A2 | 10/1999 |
| EP | 1 014 613 A2 | 6/2000 |
| EP | 1 077 552 | 8/2000 |
| EP | 1 061 684 | 12/2000 |
| EP | 1 063 803 | 12/2000 |
| JP | 04319830 | 11/1992 |
| JP | 10135916 | 5/1998 |
| WO | WO 98/47255 | 10/1998 |
| WO | WO 99/65164 | 12/1999 |

OTHER PUBLICATIONS

Notification of Transmittal of the International Search Report or the Declaration (PCT Rule 44.1) mailed Oct. 6, 2005, re International Application No. PCT/US2004/025565.5, 5 pages.

Sharma et al., "WDM Ring Network Using a Centralized Multiwavelength Light Source and Add-Drop Multiplexing Filters," IEEE, vol. 15, No. 6, Jun. 1997.

Written Opinion for PCT US01/11203, (4 pages).

Bellcore, *SONET Bidirectional Line-Switched Ring Equipment Generic Criteria*,", A Module of TSGR, RF-440, Generic Requirements, GR-1230-Core, Issue 4, Dec. 1998 (274 pages).

Kinoshita et al., "Flexible Twin Open Ring Metro WDM Network," OECC, pp. 713-714, Oct. 2003.

Tian et al., "OUPSR Protected Flexible Metro WDM Network," ECOC, pp. 826-827, 2003.

Boskovic et al., "Broadcast and Select OADM Nodes Application and Performance Trade-offs," OFC, pp. 158-159, 2002.

Kinoshita et al. "Flexible Metro WDM Network with Photonic Domains", Fujitsu Laboratories of America, Inc., 3 pages, Feb. 24-26, 2004.

Suzuki et al., "Prototype of 12.5GHz-Spaced Tapped-Type OADM for DWDM Metro Ring Networks," ECOC-IOOC Proceedings—vol. 4, pp. 902-903, Sep. 21-25, 2003.

Wolde, J., et al., "Optical Ethernet Metro Access Network Protype: Implementation and Results," ECOC-IOOC 2003, 3 pages, Sep. 21-25, 2003.

Notification of Transmittal of the International Search Report or the Declaration (PCT Rule 44.1) mailed Mar. 6, 2004 (9 pages) re International Application No. PCT/US 03/29157, Sep. 16, 2003.

Bacque, B. et al., "R-OADM Architecture—Now you can Control the Light," Tropic Networks, pp. 1-11, 2003.

Grenfeldt, "ERION—Ericsson optical networking using WDM technology," Ericsson Review No. 3, pp. 132-137, 1998.

Ashmead, "ROADMap for the Metro Market," Fiberoptic Product News, 3 pages (36, 38, and 40), Oct. 2001.

Batchellor, "Optical Networking the Ericsson Way," Ericsson Limited, Business Unit Transport and Cable Networks, pp. 1-4, Feb. 22, 2002.

U.S. Appl. No. 10/108,734, entitled "Method and System for Control Signaling in an Open Ring Optical Network," filed Mar. 27, 2002.

U.S. Appl. No. 10/108,741, entitled "Method and System for Testing During Operation of an Open Ring Optical Network," filed Mar. 27, 2002.

U.S. Appl. No. 10/112,022, entitled "Flexible Open Ring Optical Network and Method," filed Mar. 28, 2002.

U.S. Appl. No. 10/158,523, entitled "Optical Ring Network with Optical Subnets and Method," filed May 29, 2002.

U.S. Appl. No. 10/158,348, entitled "Multiple Subnets in an Optical Ring Network and Method," filed May 29, 2002.

U.S. Appl. No. 10/159,499, entitled "Combining and Distributing Amplifiers for Optical Network and Method," filed May 30, 2002.

U.S. Appl. No. 10/159,307, entitled "Optical Add/Drop Node and Method," filed May 30, 2002.

U.S. Appl. No. 10/159,464, entitled "Passive Add/Drop Amplifier for Optical Network and Method," filed May 30, 2002.

U.S. Appl. No. 10/246,053, entitled "Optical Network and Distributed Sub-Band Rejections," filed Sep. 17, 2002.

U.S. Appl. No. 10/262,818, entitled "Optical Ring Network with Hub Node and Method," filed Oct. 1, 2002.

U.S. Appl. No. 10/448,169, entitled "Optical ring Network with Selective Signal Regeneration and Wavelength Conversion," filed May 29, 2003.

U.S. Appl. No. 10/627,548, entitled "System and Method for Communicating Optical Traffic Between Ring Networks," filed Jul. 25, 2003.

Notification of Transmittal of the International Search Report or the Declaration (PCT Rule 44.1) mailed Jul. 11, 2006, re International Application No. PCT/US2004/016826.2-2415, 5 pages.

Yla-Jarkkoyla-Jarkko et al., "Achieving Long Repeaterless Sections in High-Density Metropolitan WDM Networks," IEEE Photonics Technology Letters, IEEE Service Center, vol. 14, No. 7, Jul. 2000, 3 pages.

* cited by examiner

OPTICAL NETWORK WITH SUB-BAND REJECTION AND BYPASS

TECHNICAL FIELD OF THE INVENTION

The present invention relates generally to optical transport systems, and more particularly to an optical network with sub-band rejection and bypass.

BACKGROUND OF THE INVENTION

Telecommunications systems, cable television systems and data communication networks use optical networks to rapidly convey large amounts of information between remote points. In an optical network, information is conveyed in the form of optical signals through optical fibers. Optical fibers comprise thin strands of glass capable of transmitting the signals over long distances with very low loss. Optical networks often employ wavelength division multiplexing (WDM) or dense wavelength division multiplexing (DWDM) to increase transmission capacity. In WDM and DWDM networks, a number of optical channels are carried in each fiber at disparate wavelengths. Network capacity is based on the number of wavelengths, or channels, in each fiber and the bandwidth, or size of the channels.

SUMMARY OF THE INVENTION

A method of transporting traffic on an optical ring includes, at one or more nodes coupled to the optical ring, splitting an incoming signal (including traffic in a plurality of sub-bands) into a first signal and a second signal. The first signal includes the traffic in a first sub-band of traffic channels and the second signal includes the traffic in the remaining sub-bands of traffic channels of the incoming signal. The method also includes receiving the traffic in the first sub-band at a bypass element, rejecting the traffic in a first portion of the first sub-band at the bypass element, and forwarding the traffic in a second portion of the first sub-band at the bypass element. In addition the method includes, combining the traffic in the second signal with the traffic in the second portion of the first sub-band for transport on the network.

Technical advantages of the present invention include providing an optical ring network with distributed sub-band rejection filters and with sub-band by-pass elements. Such a network allows for one or more nodes of the network to be assigned a particular sub-band or portion a sub-band in which the node may add or drop traffic. The assignment of a sub-band or sub-band portion to each node allows for an open ring network with flexible channel spacing within the assigned sub-bands or portions thereof. The network need not be physically opened at any one point and Unidirectional Path-Switched Ring (UPSR) protection switching is thus supported.

Furthermore, embodiments of the present invention allow for the sharing of a particular sub-band in an optical network. This sharing of sub-bands allows for additional nodes to be added to a network in which all of the sub-bands have already been assigned by simply installing a bypass element in one or more nodes. Such a bypass element allows particular nodes to share a sub-band that was previously assigned to a single node. Thus network capacity may be increased with having to reconfigure most of the nodes on the network.

It will be understood that the various embodiments of the present invention may include some, all, or none of the enumerated technical advantages. In addition, other technical advantages of the present invention may be readily apparent to one skilled in the art from the figures, description and claims included herein.

BRIEF DESCRIPTION OF THE DRAWINGS

For a more complete understanding of the present invention and its advantages, reference is now made to the following description taken in conjunction with the accompanying drawings, wherein like numerals represent like parts, in which.

DETAILED DESCRIPTION OF EMBODIMENTS OF THE INVENTION

Figure 1:
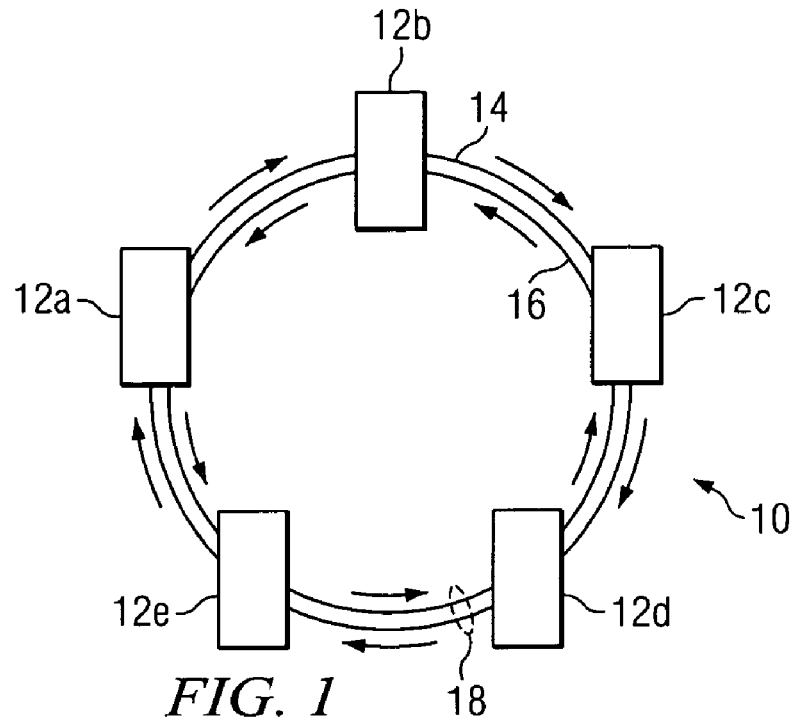
FIG. 1 is a block diagram illustrating an optical ring network in accordance with one embodiment of the present invention.

FIG. 1 illustrates an optical network 10 in accordance with one embodiment of the present invention. In this embodiment, the network 10 is an optical ring network in which a number of optical channels are carried over a common path at disparate wavelengths. The network 10 may be a wavelength division multiplexing (WDM), dense wavelength division multiplexing (DWDM), or other suitable multi-channel network. The network 10 may be used in a short-haul metropolitan network, and long-haul inter-city network, or any other suitable network or combination of networks.

As described in more detail below, network 10 is a ring network with sub-band rejections and bypassing occurring at various points in the ring. A sub-band, as used herein, means a portion of the bandwidth of the network comprising a subset of the channels of the network. In particular embodiments, the entire bandwidth of a network may be divided into sub-bands of equal bandwidth, or, alternatively, of differing bandwidth.

Referring to FIG. 1, network 10 includes a plurality of nodes 12 and an optical ring 18 comprising a first optical fiber 14 and a second optical fiber 16. In particular embodiments, optical information signals may be transmitted in both a clockwise and counterclockwise direction around ring 18 on fibers 14 and 16, respectively. Thus each node 12 may both transmit traffic to and receive traffic from each neighboring node 12. As used herein, the term "each" means every one of at least a subset of the identified items. It will be understood that optical ring 18 may comprise a two unidirectional optical fibers, as illustrated, or may comprise a single, bi-directional optical fiber. The optical signals have at least one characteristic modulated to encode audio, video, textual, real-time, non-real-time and/or other suitable data. Modulation may be based on phase shift keying (PSK), intensity modulation (IM) and other suitable methodologies.

The nodes 12 are operable to add and drop traffic to and from ring 18. At each node 12, traffic received from local clients is added to ring 18 while traffic destined for local clients is dropped. Traffic may be added to ring 18 by inserting the traffic channels or otherwise combining signals of the channels into a transport signal of which at least a portion is transmitted on one or both fibers 14 and 16. In particular embodiments, each node 12 is assigned a sub-band (or a portion of a sub-band) in which to add its local traffic. The node 12 also filters out or otherwise rejects ingress traffic in this band that has already circulated around the ring. Thus, each node 12 controls interference of channels in the network 10 by both adding and removing traffic in its sub-band. In other embodiments, each node may be assigned a sub-band (or a portion of a sub-band) in which it is to receive traffic. In such embodiments, the node 12 filters out or otherwise rejects ingress traffic in this band to prevent interference. In one embodiment, nodes 12 are further operable to multiplex data from clients for adding to ring 18 and to demultiplex channels of data from ring 18. Nodes 12 may also perform optical-to-electrical or electrical-to-optical conversion of the signals received from and sent to the clients.

Signal information such as wavelengths, power and quality parameters may be monitored in nodes 12 and/or by a centralized control system. Thus, nodes 12 may provide for circuit protection in the event of a line cut in one or both of fibers 14 and 16. In one embodiment, an optical supervisory channel (OSC) may be used by the nodes to communicate with each other and with the control system to provide protection switching. In other embodiments, as described in further detail below in reference to FIG. 2, network 10 may be a Unidirectional Path-Switched Ring (UPSR) network in which a switch is toggled so as to forward to a local client traffic from a direction (clockwise or counterclockwise) corresponding to the lower bit error rate (BER) and/or preferred power level.

Figure 2:
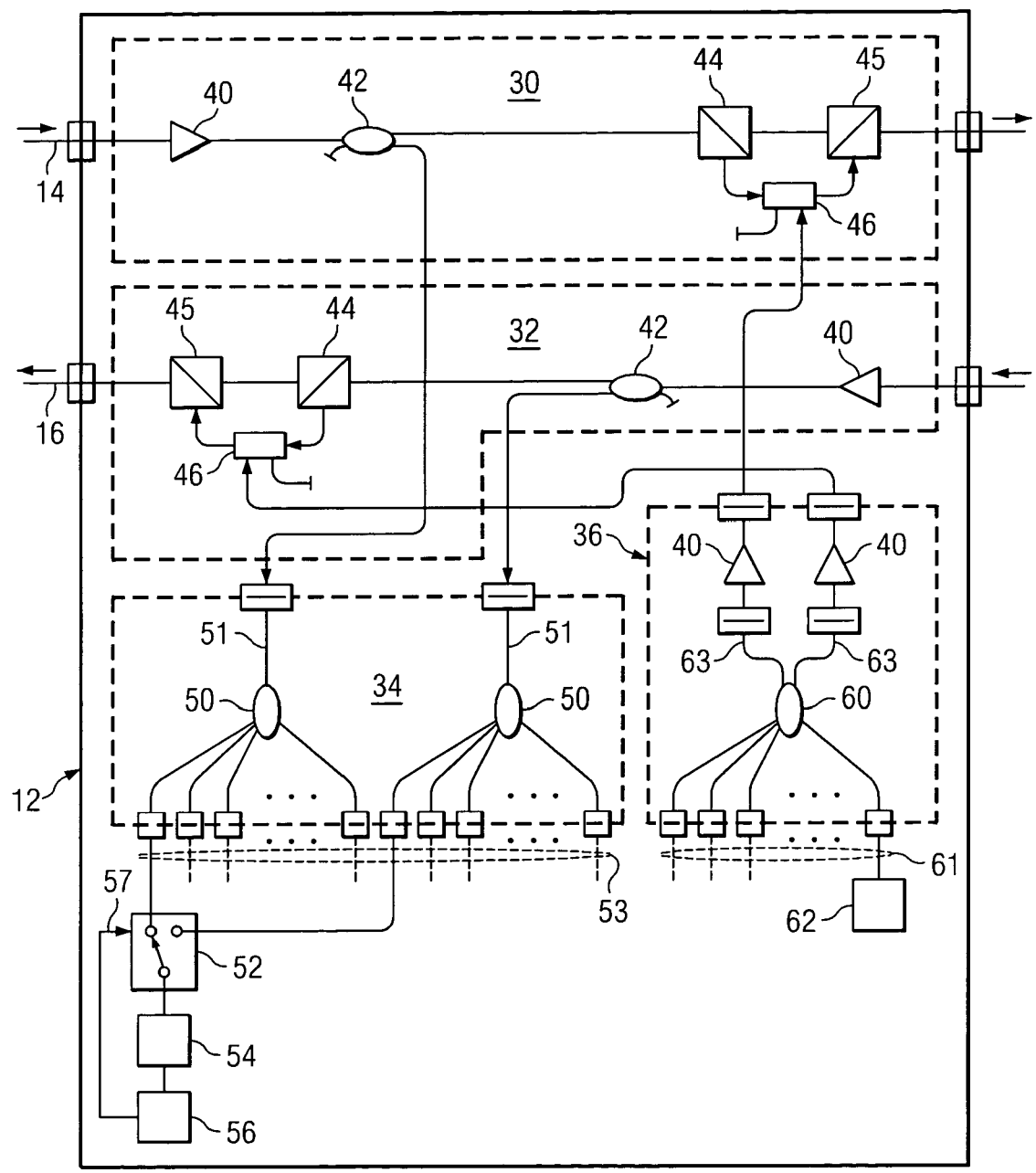
FIG. 2 is a block diagram illustrating details of an add/drop node of FIG. 1, in accordance with one embodiment of the present invention.

FIG. 2 illustrates details of node 12 in accordance with one embodiment of the present invention. In the illustrated node 12, traffic is passively dropped from ring 18 with passive splitters. "Passive" in this context means without power, electricity, and/or moving parts. An active device would thus use power, electricity and/or moving parts to perform work. In addition, the illustrated embodiment also uses filters to reject a portion of a sub-band of the network assigned to node 12, with the remaining sub-bands passing through node 12. As described below, local traffic may be added to ring 18 in the assigned portion of the sub-band.

Referring to FIG. 2, node 12 comprises a first, or counter-clockwise transport element 30, a second, or clockwise transport element 32, a combining element 36 and a distributing element 34. Transport elements 30 and 32 add and drop traffic to and from ring 18, remove previously transmitted traffic, and/or provide other interaction of node 12 with ring 18. Combining element 36 generates local add signals to be added to ring 18 by transport elements 30 and 32. Distributing element 34 distributes signals dropped by transport elements 30 and 32 into discrete signals for recovery of local drop traffic. In particular embodiments, the transport, combining, and distributing elements 30, 32, 36 and 34 may each be implemented as a discrete card and interconnected through a backplane of a card shelf of the node 12. Alternatively, the functionality of one or more elements 30, 32, 36 and 34 may be distributed across a plurality of discrete cards. In this way, node 12 is modular, upgradeable, and provides a "pay-as-you-grow" architecture. The components of node 12 may be coupled by direct, indirect or other suitable connection or association. In the illustrated embodiment, the elements 30, 32, 36 and 34 of node 12 and devices in the elements are connected with optical fiber connections, however, other embodiments may be implemented in part or otherwise with planar wave guide circuits and/or free space optics.

Each transport element 30 and 32 of node 12 is connected or otherwise coupled to a corresponding fiber 14 or 16 to add and drop traffic to and from the ring 18. Each transport element 30 and 32 comprises an optical splitter element 42 operable to split an ingress signal into an intermediate signal and a drop signal. Transport elements 30 and 32 also each comprise a sub-band rejection filter 44 operable to reject a sub-band of the network assigned to node 12 from the intermediate signal to generate a passthrough signal including a plurality of disparate sub-bands of the network. Furthermore, transport elements 30 and 32 each comprise a bypass element 46 operable to terminate a first portion of the rejected sub-band assigned to node 12 and to pass a second portion of the sub-band not assigned to node 12. In addition, transport elements 30 and 32 each comprise an add element 45 operable to receive the second portion of the sub-band and to add both the second portion of the assigned sub-band and local traffic generated a node 12 in the first portion of the assigned sub-band to the passthrough signal for transport over ring 14 or 16.

Optical splitters 42 may each comprise an optical fiber coupler or other optical splitter operable to combine and/or split an optical signal. Splitters 42 may provide flexible channel-spacing such that there may be no restrictions on channel-spacing in the traffic on rings 14 and 16. As used herein, an optical splitter or an optical coupler is any device operable to combine or otherwise generate a combined optical signal based on two or more optical signals without multiplexing and/or to split or divide an optical signal into discrete optical signals or otherwise passively discrete optical signals based on the optical signal without demultiplexing. The discrete signals may be similar or identical in frequency, form, and/or content. For example, the discrete signals may be identical in content and identical or substantially similar in power, may be identical in content and differ substantially in power, or may differ slightly or otherwise in content. In one embodiment, each splitter 42 may split the signal into two copies with substantially equal power. Furthermore, as examples only, splitters 42 may have a directivity of over 55 dB and an insertion loss less than about 3.5 dB.

Figure 3A:
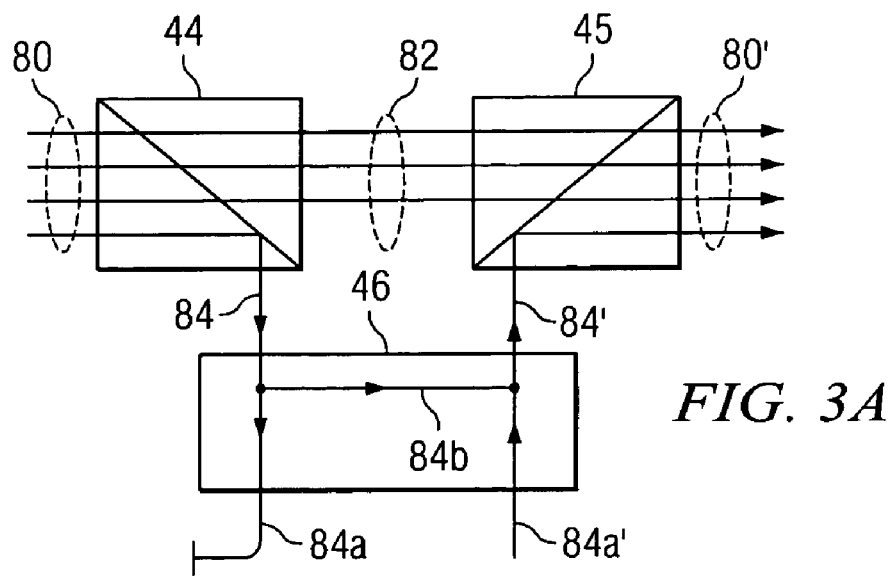
FIG. 3A is a block diagram illustrating operation of a rejection filter, bypass element, and add element of the add/drop node of FIG. 2, in accordance with one embodiment of the present invention.
Figure 3B:
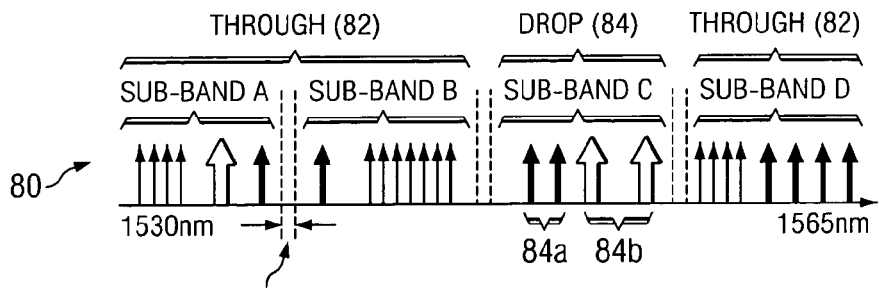
FIG. 3B is a diagram illustrating the add, drop, and pass-through sub-bands of FIG. 3A in accordance with one embodiment of the present invention.

Filter 44, as described in further detail below in reference to FIGS. 3A and 3B, is operable to reject traffic in an assigned sub-band, and to pass the remaining traffic. The term "reject" as used herein may mean dropping, terminating, or otherwise removing traffic from the main optical signal on a ring 14 or 16. Filter 44 may be optically passive in that traffic multiplexing and/or demultiplexing is not required. Filters 44 may comprise a thin-film, fixed filters, tunable filters, or other suitable filters, and each filter 44 may comprise a single filter or a plurality of filters connected serially, in parallel, or otherwise.

Bypass element 46 is a device that allows sub-band-sharing, such as a filter or an interleaver. As described below with reference to FIG. 3B, the first and second portions of the sub-band assigned to node 12 may comprise discrete portions of the band of channels/wavelengths comprising the sub-band (as an example only, a first portion that includes the lower half of the wavelengths comprising the sub-band and a second portion that includes the upper half of the wavelengths). In such a case, bypass element 46 may comprise a filter that can separate these two portions. As also described below with reference to FIG. 3B, the first and second portions of the sub-band assigned to node 12 may alternatively comprise interleaved portions of the band of channels/wavelengths comprising the sub-band. In such a case, bypass element 46 may comprise an interleaver that can separate these two portions. Furthermore, any other appropriate schemes for dividing the channels of a sub-band into portions and devices for separating these portions may be used.

Regardless of the type of bypass element 46 that is used, bypass element 46 separates a first portion of a sub-band assigned to node 12 from a second portion of the sub-band. The first portion is terminated after being separated, since traffic is added from node 12 in this portion of the assigned sub-band, and thus this traffic has already traveled around network 10. Bypass element 46 also combines the second portion with local traffic being added by node 12 (coming from combining element 36) in the first portion of the assigned sub-band. Depending on how the first and second portions are separated in the relevant sub-band, the passed-through second portion and the added first portion may be combined in an appropriate manner. These combined first and second portions of the sub-band are then added to the traffic passed by rejection filter 44 using add element 45. Add element 45 may be a coupler or any other suitable device.

Although the use of a sub-band divided into two portions is described above, in other embodiments the sub-band may alternatively be divided into three or more portions, with the bypass element 44 separating a first portion assigned to a node 12 (which is terminated) from the other portions of the sub-band (which are passed-through the bypass element to add element 45).

In one embodiment, transport elements 30 and 32 also each include an amplifier 40. Amplifiers 40 may be erbium-doped fiber amplifier (EDFAs) or other suitable amplifiers capable of receiving and amplifying an optical signal. The output of the amplifier may be, for example, 17 dBm. As the span loss of clockwise fiber 14 may differ from the span loss of counterclockwise fiber 16, amplifiers 40 may use an automatic level control (ALC) function with wide input dynamic-range. Hence amplifiers 40 may deploy automatic gain control (AGC) to realize gain-flatness against input power variation, as well as variable optical attenuators (VOAs) to realize ALC function. In a particular embodiment, one or more nodes 12 in network 10 may include an amplified spontaneous emission (ASE) filter (not illustrated) coupled to amplifiers 40 to prevent the buildup of unwanted spontaneous emission or noise from the amplifiers of the network 10.

During operation of node 12, amplifier 40 of each transport element 30 and 32 receives an ingress transport signal from the connected fiber 14 or 16 and amplifies the signal. The amplified signal is forwarded to optical splitter 42. Optical splitter 42 passively splits the amplified signal into an intermediate signal and a local drop signal. The intermediate signal is forwarded to filter 44. Filter 44 rejects (drops) a sub-band of the intermediate signal that includes at least a portion assigned to node 12. The remaining, non-rejected signal forms a passthrough signal that is forwarded to add element 45. The rejected sub-band is forwarded to bypass element 46, which separates the rejected sub-band into a first portion assigned to node 12 and one or more other portions not assigned to node 12 (assigned to other nodes 12 in network 10). The first portion is terminated, and the other portions are combined by the bypass element 46 with local traffic being added in the first portion of the sub-band (the portion assigned to node 12). The combined sub-band signal is then forwarded to add element 45, which adds the sub-band signal to the passthrough signal from rejection filter 44 for transport on fiber 14 or 16.

The local drop signal is forwarded from splitter 42 to distributing element 34 for processing. In the illustrated embodiment, distributing element 34 comprises drop splitters 50 that receive dropped signals from fibers 14 or 16. Splitters 50 may comprise optical couplers with one optical fiber ingress lead 51 and a plurality of optical fiber drop leads 53. One or more of the drop leads 53 may each be connected to a filter 54 (via a switch 52), which in turn may be connected to one or more drop optical receivers 56. It should be understood that any appropriate number of drop leads 53 and associated filters 54 and receivers 56 may implemented. Filters 54 may be implemented such that each filter 54 allows a different channel or group of channels of the signal coming from the associated drop lead (the sub-band assigned to node 12) to pass to the receiver 56 associated with the filter 54. Filters 54 may be tunable filters or other suitable filters, and receivers 56 may be broadband receivers or other suitable receivers. Such a configuration allows each receiver 56 associated with a particular ring 14 or 16 to receive a different wavelength, and to forward the information transmitted in that wavelength to appropriate clients.

In the illustrated embodiment, each drop lead 53 is connected to a switch 52 which allows selective connection of a receiver 56 with either an associated drop lead 53 coming from ring 14 or an associated drop lead coming from ring 16. Such selective switching may be used to implement UPSR protection switching. In a particular embodiment, switch 52 is initially configured to forward to the local client(s) traffic from a ring 14 or 16 that has the lower bit error rate (BER). A threshold value is established such that the switch remains in its initial state as long as the BER does not exceed the threshold. Another threshold or range may be established for power levels. For example, if the BER exceeds the BER threshold or if the power falls above or below the preferred power range, the switch selects the other signal. Commands for switching may be transmitted via connection 57. This results in local control of and simple and fast protection.

In the illustrated embodiment, combining element 36 comprises a coupler 60 which receives traffic from a plurality of optical fiber add leads 61 that are connected to one or more add optical transmitters 62 that are each associated with a local client or other traffic source. Combining element 36 further comprises two optical fiber egress leads 63 which feed into amplifiers 40. In other embodiments, amplifiers 40 may be omitted. Amplifiers 40 may comprise EDFAs or other suitable amplifiers.

Prior to being forwarded to coupler 60, locally-derived add traffic is received from one or more of the optical transmitters 62. A separate optical transmitter 62 may be used for each channel (or sub-band of channels) in which traffic is to be added at a node 12. Furthermore, each add lead 61 may be associated with a different channel (or sub-band of channels). Therefore, there may be an transmitter 62 and add lead combination for each separate channel (or sub-band of channels) in which traffic is desired to be added at a particular node 12. It will be understood that any appropriate number of optical transmitters 62 and associated add leads 61 may be used. Coupler 60 combines the add traffic received from one or more of the transmitters 62 and forwards the combined add signal over both egress leads 63 to amplifiers 40. The amplified add traffic is then forwarded to bypass element 46, for addition to the associated ring 14 or 16, as described above.

In the illustrated embodiment, the same or substantially the same signals are communicated over both rings 14 and 16. Therefore, a single set of receivers 56 may be used to receive signals from rings 14 or 16 (one or the other are received, depending on the position of switch 52), the same set of transmitters 62 may be used to transmit the same signals to both rings 14 and 16. Such a configuration is appropriate when providing UPSR protection. However, in other embodiments, node 12 may include a separate set of receivers 56 associated with each of rings 14 and 16, and a separate set of transmitters 62 associated with each of rings 14 and 16. In this case, no switch 52 is needed. Instead, the drop leads 53 associated with each ring 14 or 16 are coupled to the set of receivers 56 associated with each ring. Therefore, different signals may be received from rings 14 and 16.

Similarly, instead of splitting the signal from a set of transmitters 62 using a splitter 60 and providing this signal to both rings 14 and 16, a different signal my be generated by the set of transmitters 62 associated with ring 14 and the set of transmitters 62 associated with ring 16. Therefore, different signals may be communicated over each ring 14 and 16. For example, a first signal can be added in a particular channel on ring 14 at a node 12, and an entirely different signal can be added in the same channel on ring 16 by the same node 12.

FIG. 3A is a block diagram illustrating operation of filter 44, bypass element 46, and add element 45 of node 12 of FIG. 2, in accordance with one embodiment of the present invention. Filter 44 is operable to receive an input optical signal 80 carrying traffic in a plurality of sub-bands. A sub-band is a portion of the bandwidth carried in the network. Each sub-band may carry one or more traffic channels. The traffic channels may be flexibly spaced within the sub-band. Band-pass filter 44 splits (rejects) the traffic 84 in a first sub-band assigned to the associated node 12 from the signal 80 and passes the traffic 82 in the remaining second, third, and fourth sub-bands that are illustrated. The rejected traffic 84 is communicated to bypass element 46. It will be understood that filters 44 at one or more other nodes 12 may be configured to reject different sub-bands, so that each node adds traffic in a different sub-band (or portion of a sub-band).

Bypass element 46 receives the rejected traffic 84 in the first sub-band and separates traffic 84a in a first portion of the first sub-band that is assigned to associated node 12 from traffic 84b in a second portion of the first sub-band that is assigned to another node(s) 12. Traffic 84a is terminated, as described above, since node 12 adds traffic 84a' in this first portion of the first sub-band. Traffic 84b in the second portion is passed through bypass element 46 and is combined with the traffic 84a' being added in the first portion of the first sub-band. This combined traffic 84' in the first sub-band is then forwarded to add element 45, which combines traffic 84' in the first sub-band with the pass-through traffic 82 in the other sub-bands to create an output signal 80'.

FIG. 3B is a diagram illustrating example sub-bands passed, added, and/or dropped at filter 44, bypass element 46, or add element 45, as illustrated in FIG. 3A, in accordance with one embodiment of the present invention. As described above in reference to FIG. 3A, band-pass filter 44 may pass through selected sub-bands 82 of signal 80, and reject one or more selected sub-bands 84 from the signal 80. In the illustrated embodiment, the pass-through sub-bands 82 include sub-bands A and B, which comprise a plurality of channels in the lower end of the C-Band spectrum. In the illustrated embodiment, sub-band A comprises four 2.5 Gb/s channels, one 10 Gb/s channel, and one 40 Gb/s channel (represented respectively by the small, medium, and large arrows), and sub-band B comprises one 10 Gb/s channel and seven 2.5 Gb/s channels. Pass-through sub-bands 82 also include sub-band D, which is at the upper end of the C-Band spectrum and comprises four 2.5 Gb/s channels and four 10 Gb/s channels.

The rejected sub-band 84, sub-band C, comprises two 10 Gb/s channels and two 40 Gb/s channels in the mid-range of the C-Band spectrum. Sub-band C includes a first portion 84a that includes the two 10 Gb/s channels and a second portion 84b that includes the two 40 Gb/s channels. As described above, this sub-band may be shared by two nodes 12, where a first node adds local traffic in the first portion 84a and a second node 12 adds local traffic in the second portion 84b. Although two portions are illustrated, the rejected sub-band may be divided into more than two portions or may not be divided at all. In addition, some or all of the other sub-bands in the network may be so divided. Furthermore, the various portions of the rejected sub-band may not be separated into contiguous portions of the sub-band, but instead may be interleaved (at least in part). Moreover, the portions in a sub-band may have equal or unequal bandwidths.

Although exemplary channel spacing is illustrated in sub-bands 82 and 84 of FIG. 3B, channel spacing may be flexible (there is no restriction on the channel spacing within the sub-bands). It will be also understood that the bandwidth of the network may comprise other suitable bands, and that the bandwidth may be otherwise subdivided into sub-bands of different sub-bandwidths. Furthermore, in particular embodiments, some non-traffic-carrying bandwidth is provided between adjacent sub-bands to avoid interference. In the illustrated embodiment, spacing 90 comprises a 200 GHz guard-band between adjacent sub-bands. Traffic signals are not allocated in the guard-bands so as to minimize signal loss and/or interference.

Figure 4:
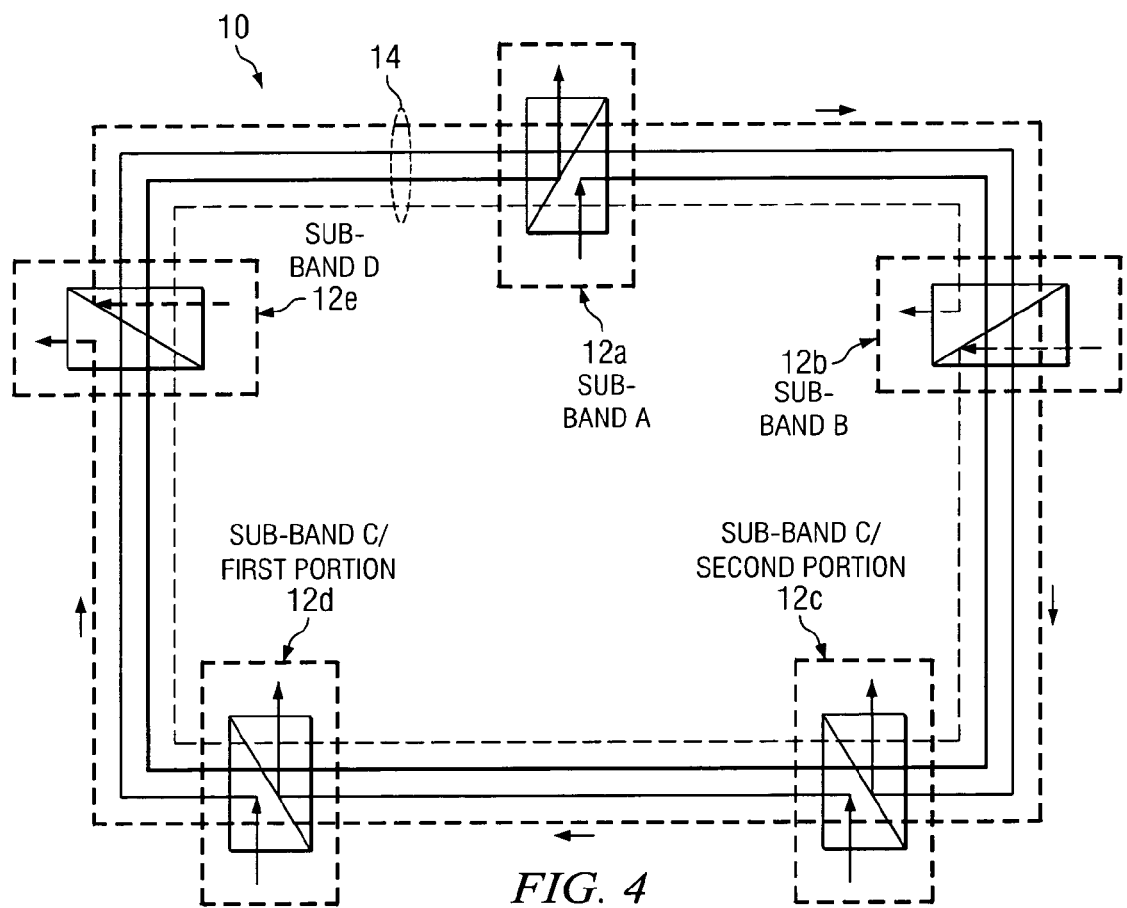
FIG. 4 is a block diagram illustrating exemplary travel paths of sub-bands of the network of FIG. 1 in accordance with one embodiment of the present invention.

FIG. 4 is a block diagram illustrating exemplary bandwidth travel paths on the optical ring of FIG. 1 in accordance with one embodiment of the present invention. In the embodiment shown in FIG. 4, each of the nodes 12 rejects traffic from ring 18 from an assigned sub-band (or a portion of an assigned sub-band) and adds new traffic to ring 18 in the assigned sub-band, (or a portion of the assigned sub-band). For ease of illustration, only fiber 14 of ring 18 is illustrated. It will be understood that the paths shown in FIG. 4 have corresponding paths in the counterclockwise direction on fiber 16.

Referring to FIG. 4, traffic is added at node 12a in sub-band A and travels around fiber 14 to be rejected from fiber 14 when it again reaches node 12a. In this way, channel interference is avoided. Likewise, sub-band B is rejected and added at node 12b, and sub-band D is rejected and added at node 12e. As described with reference to FIGS. 3A and 3B, sub-band C is shared between nodes 12c and 12d. Therefore, sub-band C is rejected by a filter 44 of each of nodes 12c and 12d. A bypass element 46 of node 12d terminates the signals in the first portion of sub-band C and adds signals in this second portion. The bypass element 46 of node 12d passes the first portion of sub-band C, and it is added back onto fiber 14 along with add traffic in the second portion of sub-band C. At node 12c, a bypass element 46 terminates the signals in the second portion of sub-band C and adds signals in this first portion. The bypass element 46 of node 12d passes the second portion of sub-band C, and it is added back onto fiber 14 along with add traffic in the first portion of sub-band C. Although nodes 12c and 12d are located next to one another in network 10, nodes 12 do not need to be so located to share a sub-band.

It will be understood that although only sub-band C is illustrated as being shared between nodes 12c and 12d, some or all of the other nodes 12 may share the same sub-band or different sub-bands. Therefore, network may include multiple sub-bands that are each shared by two or more nodes 12 (and may also include one or more sub-bands that are only assigned to a single node 12). Each node 12 that shares a sub-band may be constructed as illustrated in FIG. 2. If particular nodes 12 reject and add traffic on a particular sub-band, but do not share that sub-band with any other nodes 12, then such nodes may not include all the elements illustrated in FIG. 2. For example, nodes 12 that do not share a sub-band may not include bypass element 46. In the place of bypass element 46, rejection filter 44, and add element 45, such nodes may simply include a band-pass rejection filter coupled to each fiber 14 and 16 that both rejects signals in the assigned sub-band and that receives (from combining element 36) and adds local traffic to the associated fiber 14 or 16. These functions may also be performed by one than one element.

Figure 5:
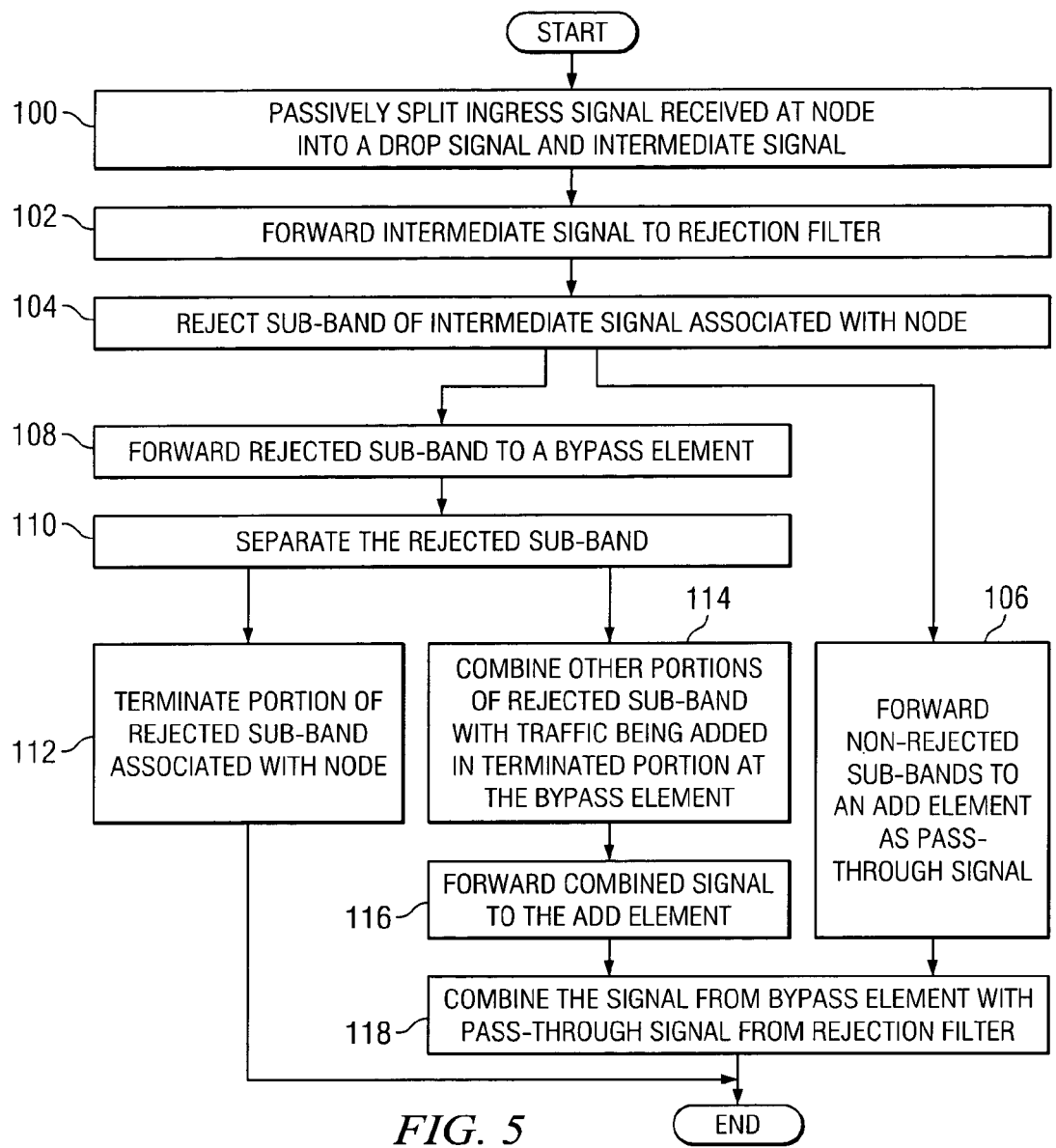
FIG. 5 is a flowchart illustrating an example method transporting traffic on an optical network accordance with one embodiment of the present invention.

FIG. 5 is a flowchart illustrating an example method of transporting traffic on an optical network in accordance with one embodiment of the present invention. As described above, traffic is transported in an optical ring network, with each node assigned a sub-band of the network traffic, or a portion thereof, in which to add traffic. In the example method, at least one sub-band is shared by two or more nodes. The sub-bands may include any suitable number of traffic channels. The traffic may be transported in a first direction and a second direction on the optical ring.

Beginning with step 100, at each node coupled to the ring that shares a sub-band with one or more other nodes, a transport signal comprising ingress traffic is passively split into a drop signal (for distribution to local clients of the node) and an intermediate signal. At step 102, the intermediate signal is forwarded to a rejection filter. At step 104, the filter rejects a sub-band of the intermediate signal that includes a portion thereof assigned to the respective node. At step 106, the remaining, non-rejected signal is forwarded to an add element as a passthrough signal. At step 108, the rejected sub-band is forwarded to a bypass element, and the rejected sub-band is separated by the bypass element at step 110 into a first portion that is assigned to the respective node and one or more other portions that are not assigned to the node (that are assigned to other nodes in the network). The first portion is terminated at step 112. At step 114, the remaining portions of the rejected sub-band are combined by the bypass element with local traffic being added in the first portion of the rejected sub-band (the portion assigned to the respective node). At step 116, the combined sub-band signal is then forwarded to the add element, which then combines the sub-band signal to the passthrough signal from the rejection filter at step 118 for combined transport on the network.

Figure 6:
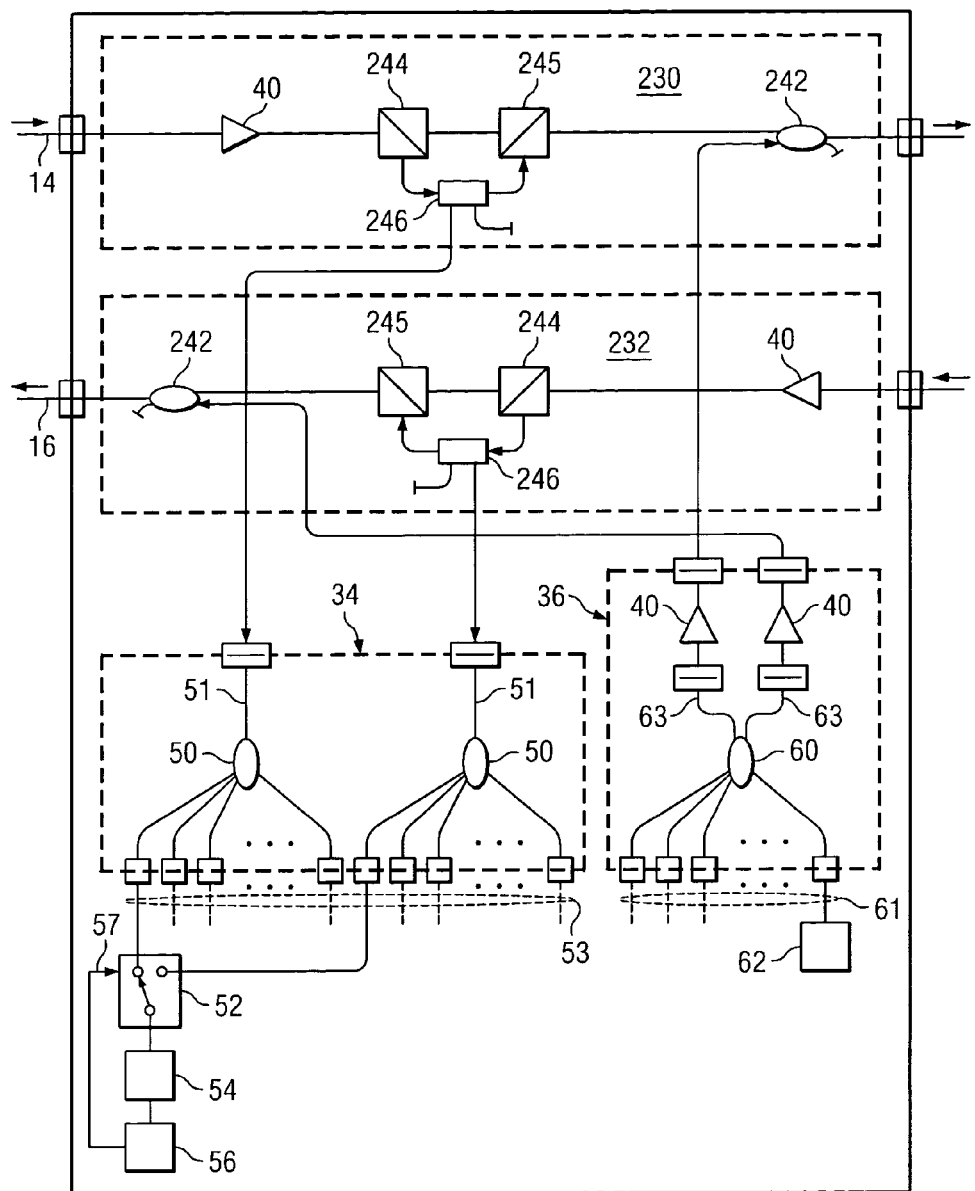
FIG. 6 is a block diagram illustrating details of an add/drop node in accordance with another embodiment of the present invention.

FIG. 6 is a block diagram illustrating details of an add/drop node 212 in accordance with another embodiment of the present invention. In particular embodiments, one or all of the elements shown in node 212 of FIG. 5 may be used in place of elements shown in node 12 of FIG. 2. Node 212 comprises combining element 36 and distributing element 34, as described above with reference to FIG. 2. However, in place of transport elements 30 and 32, node 212 comprises transport elements 230 and 232.

Transport elements 230 and 232 each comprise a sub-band rejection filter 244 operable to reject a sub-band of the network assigned to node 212 from the ingress signal and pass the remaining sub-bands. Sub-band rejection filter 244 may be constructed similarly to or in the same manner as sub-band rejection filter 44. Furthermore, transport elements 230 and 232 each comprise a bypass element 246 operable to drop a first portion of the rejected sub-band assigned to node 212 and to pass a second portion of the sub-band not assigned to node 212. Bypass element 246 may be constructed similarly to bypass element 46. In addition, transport elements 230 and 232 each comprise an add element 245 operable to receive the second portion of the sub-band and to add the second portion of the assigned sub-band back into the sub-bands passed by rejection filter 244 to create an intermediate signal. Add element 245 may be constructed similarly to or in the same manner as add element 45. The intermediate signal from add element 245 is forwarded to an optical coupler 242. Coupler 242 may be constructed similarly to splitter 42, as described above. Coupler 242 combines the intermediate signal and traffic being added at node 212 in the portion of the sub-band assigned to node 212 (the first portion that was rejected by rejection filter 244) to create a passthrough signal that is forwarded from node 12 on rings 14 and 16.

The components of transport elements 230 and 232 of node 212 are therefore similar to those of transport elements 30 and 32 of node 12; however, components 44-46 of node 12 are used as an add filter while components 244-246 of node 212 are used as a drop filter. Therefore, while node 12 is assigned a particular portion of a sub-band in which to add traffic (and can drop traffic in any other sub-band), node 212 is assigned a particular portion of a sub-band in which to drop traffic (and can add traffic in any other sub-band). Therefore, all other nodes on a network including node 212 will be configured to send traffic destined for a local client of node 212 on a particular portion of a particular sub-band (or in a particular sub-band if node 212 does not share a sub-band with any other nodes).

During operation of node 212, an amplifier 40 of each transport element 230 and 232 receives an ingress transport signal from the connected fiber 14 or 16 and amplifies the signal. The amplified signal is forwarded to filter 244. Filter 244 rejects (drops) a sub-band of the ingress signal that includes at least a portion assigned to node 212. The remaining, non-rejected signal forms an intermediate signal that is forwarded to add element 245. The rejected sub-band is forwarded to bypass element 246, which separates the rejected sub-band into a first portion assigned to node 212 and one or more other portions not assigned to node 212 (which may be assigned to other nodes 212 in the network). The first portion is dropped to distributing element 34, as described above in FIG. 2. The other portions are forwarded to add element 245, which adds the other portions of the rejected sub-band signal to the intermediate signal from rejection filter 244. This intermediate signal (which includes all the traffic not destined for node 212) is forward to coupler 242. Coupler 242 receives the intermediate signal and combines the intermediate signal with signals received from combining element 36, as described above (the traffic being added at node 212 via combining element 36 is in the first portion of the sub-band that was rejected by rejection filter 244). The combined signal is then forwarded on rings 14 and 16 to the next node on the rings.

In the illustrated embodiment, the same or substantially the same signals are communicated over both rings 14 and 16. Therefore, a single set of receivers 56 may be used to receive signals from rings 14 or 16 (one or the other are received, depending on the position of switch 52), the same set of transmitters 62 may be used to transmit the same signals to both rings 14 and 16. Such a configuration is appropriate when providing UPSR protection. However, in other embodiments, node 12 may include a separate set of receivers 56 associated with each of rings 14 and 16, and a separate set of transmitters 62 associated with each of rings 14 and 16. In this case, no switch 52 is needed. Instead, the drop leads 53 associated with each ring 14 or 16 are coupled to the set of receivers 56 associated with each ring. Therefore, different signals may be received from rings 14 and 16.

Similarly, instead of splitting the signal from a set of transmitters 62 using a splitter 60 and providing this signal to both rings 14 and 16, a different signal my be generated by the set of transmitters 62 associated with ring 14 and the set of transmitters 62 associated with ring 16. Therefore, different signals may be communicated over each ring 14 and 16. For example, a first signal can be added in a particular channel on ring 14 at a node 212, and an entirely different signal can be added in the same channel on ring 16 by the same node 212.

It should be further noted that other embodiments of the present invention may combine the elements of transport elements 30/32 with those of transport elements 230/232 to provide flexibility in assigning a particular sub-band or portion thereof to a node. For example, the transport elements of one embodiment may include a drop coupler located before the sub-band filter, bypass element, and add element, and an add filter located after these components. Furthermore, the bypass filter in such an embodiment would be configured to be able to both drop traffic to a distributing element and receive add traffic from a combining element. With this combination of components, the node could either perform like node 12 or node 212, depending on how the components are configured. Such a node would therefore provide more flexibility in configuring the network.

Figure 7:
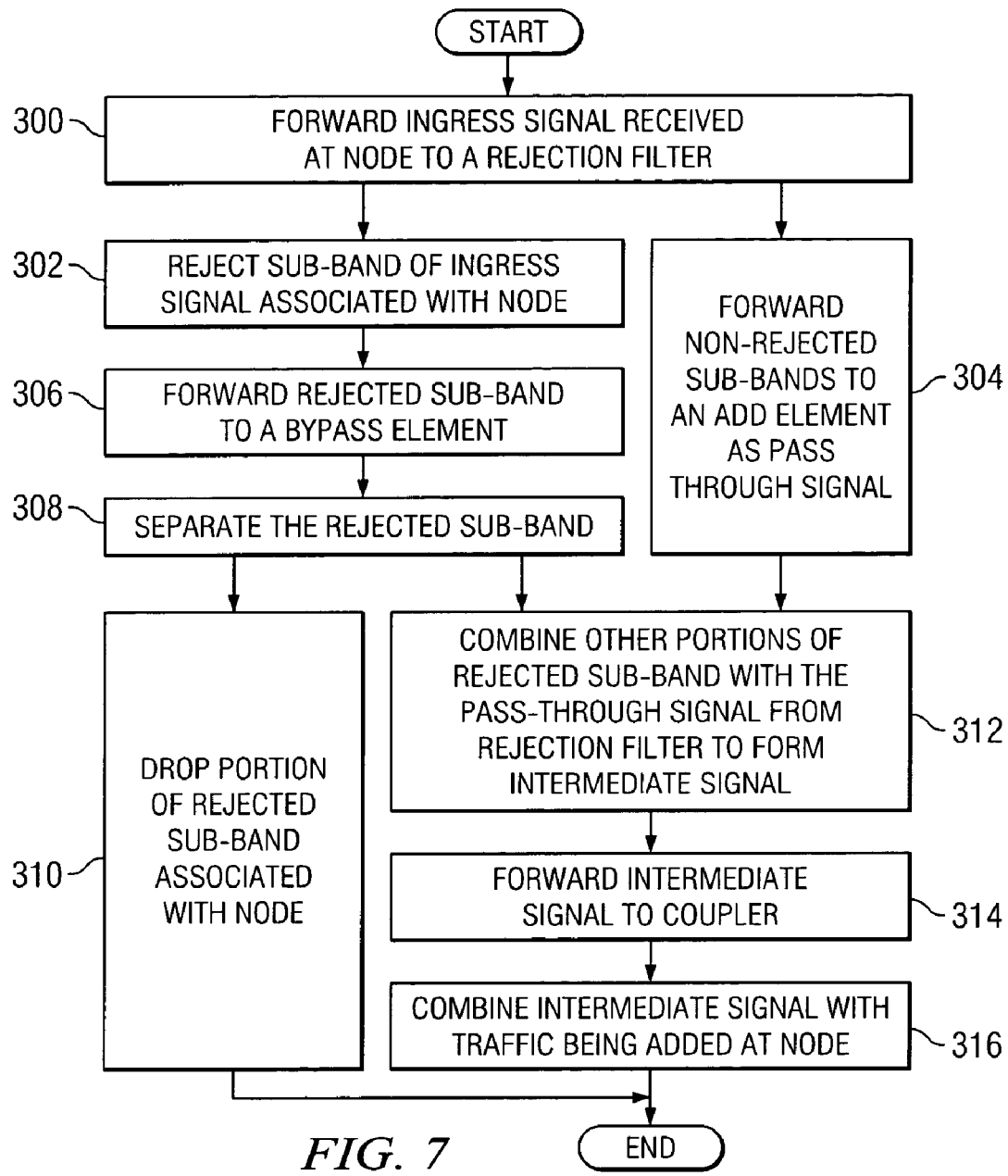
FIG. 7 is a flowchart illustrating an example method transporting traffic on an optical network accordance the embodiment of the present invention of FIG. 6.

FIG. 7 is a flowchart illustrating an example method of transporting traffic on an optical network in accordance with the embodiment of the present invention of FIG. 6. As described above, traffic is transported in an optical ring network, with each node assigned a particular sub-band of the network traffic, or a portion thereof, in which to add traffic. In the example method, at least one sub-band is shared by two or more nodes. The sub-bands may include any suitable number of traffic channels. The traffic may be transported in a first direction and a second direction on the optical ring.

Beginning with step 300, at each node coupled to the ring that shares a sub-band with one or more other nodes, a transport signal comprising ingress traffic is forwarded to a rejection filter. At step 302, the rejection filter rejects a sub-band of the ingress signal that includes at least a portion assigned to the respective node. The remaining, non-rejected signal forms an intermediate signal that is forwarded to an add element at step 304. At step 306, the rejected sub-band is forwarded to a bypass element. At step 308, the bypass element separates the rejected sub-band into a first portion that is assigned to the respective node and one or more other portions that are not assigned to the node (that may be assigned to other nodes in the network). At step 310, the first portion of the rejected sub-band is dropped by the bypass element for distribution to local clients of the node. At step 312, the other portion(s) of the rejected sub-band are forwarded to an add element, which combines the portions of the rejected sub-band signal with the intermediate signal from the rejection filter. At step 314, this intermediate signal (which includes all the traffic not destined for the respective node) is forward to a coupler. At step 316, the coupler receives the intermediate signal and combines the intermediate signal with local traffic being added at the node (the traffic being added is in the first portion of the sub-band that was rejected by the rejection filter), and the combined signal is forwarded on the network.

Figure 8:
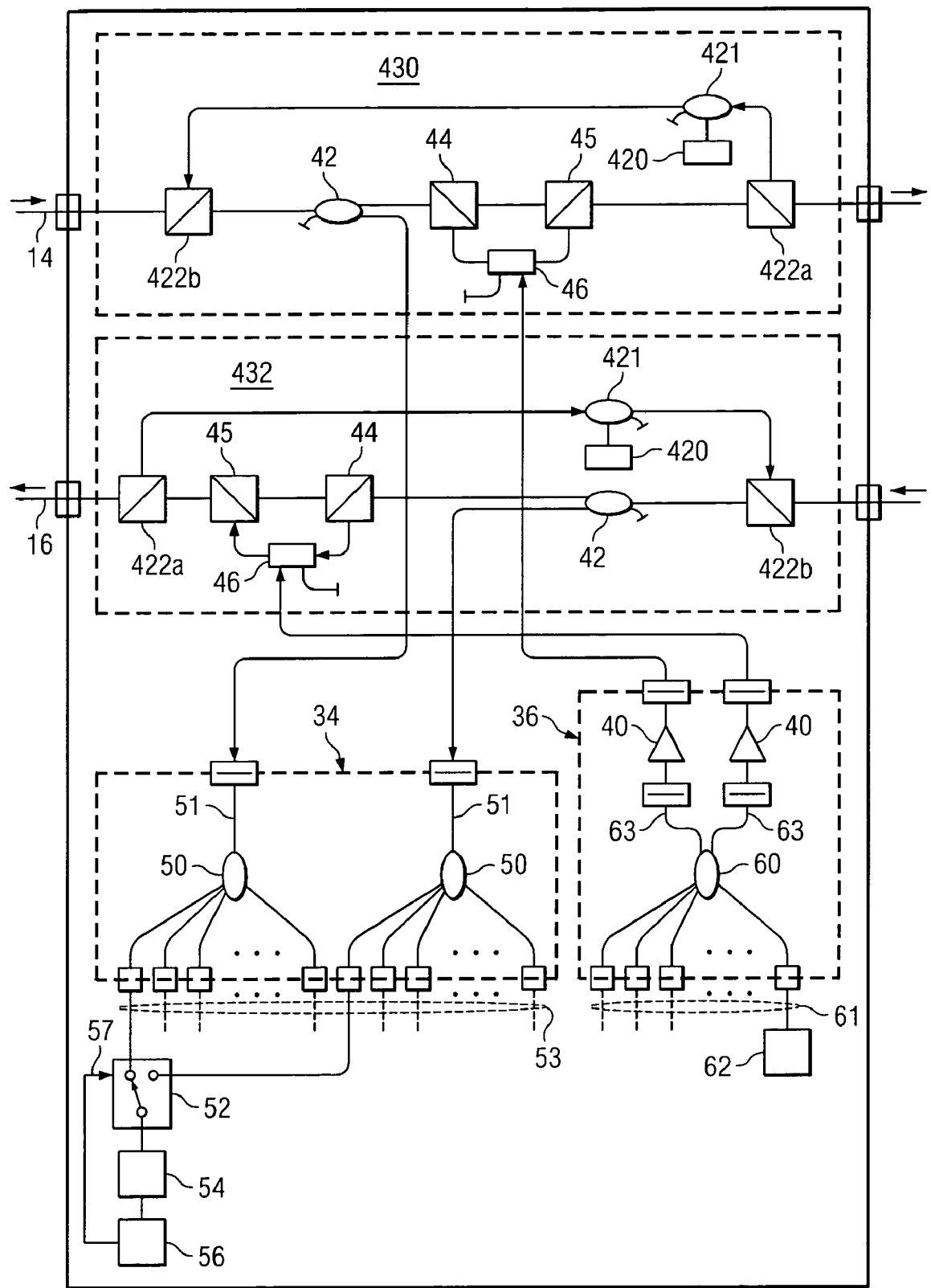
FIG. 8 is a block diagram illustrating details of an add/drop node having an amplification bypass in accordance with an embodiment of the present invention.

FIG. 8 is a block diagram illustrating details of an add/drop node 412 having an amplification bypass in accordance with an embodiment of the present invention. In the illustrated embodiment, node 412 includes the same components as node 12 illustrated in FIG. 1, except for particular components of transport elements 430 and 432. More specifically, as compared to transport elements 30 and 32 of node 12, transport elements 430 and 432 replace amplifier 40 with a Raman amplification bypass that comprises an amplification module 420, a coupler 421, and pump filters 422a and 422b. Amplification module 420 uses Raman amplification to amplify signals in a particular sub-band of wavelengths (or a portion of a sub-band).

Amplification modules 420 may comprise Raman pumps. In Raman amplification, laser light of approximately 100 nm shorter wavelength than the signal to be amplified is transmitted along the same optical fiber as the signal. The amplifier laser light may be propagated either in the same direction as the signal (co-propagating), or in the opposite direction as the signal (counter-propagating). As the amplification laser light scatters off the atoms of the fiber, the signal picks up photons and its strength is thus increased. Raman amplification does not require any doping of the optical fiber. In the illustrated embodiment, pump power is transmitted in a counter-rotational direction relative to the direction of the traffic-carrying signal. In other embodiments, pump power may be transmitted in the same direction as the traffic-carrying signal, or may be transmitted in both the same direction and in a counter-rotational direction.

Pump filters 422 may comprise WDM couplers or other suitable filters or elements operable to separate a pump power signal from a traffic-carrying signal. For the illustrated counter-rotational amplification, pump filters 422a filter the pump power from the signal and forward the pump power to amplification module 420 so that the pump power bypasses the add/drop elements of node 412. Pump filters 422b add the bypassed pump power back on to ring 14 or 16 (after possible addition of pump power for a particular sub-band by amplification module 420).

Amplification module 420 may include any suitable type of Raman pump, as are well-known to those of skill in the art. However, unlike previous uses of Raman pumps the assignment of particular sub-bands (or portions thereof) to particular nodes in a ring network allows for a unique distribution of the Raman amplifiers in the ring network. For example, a separate Raman pump may be installed for each sub-band (or for portions thereof) and thus each of these pumps may be installed at a location most suitable for that particular sub-band or portion thereof. For instance, in a ring network of nodes 412, each node 412 may include a Raman pump 420 for amplifying the sub-band or sub-band portion assigned to the adjacent downstream (based on the direction of the traffic-carrying signals) node 412. Such a location is appropriate since the downstream node 412 is adding traffic in that particular sub-band or sub-band portion and thus rejects that sub-band or sub-band portion. Therefore, the upstream node 412 including the particular Raman pump is the last node that may need to receive traffic in the particular sub-band or sub-band portion. Thus, this location of the Raman pumps allows for amplification of the signal in the sub-band or sub-band portion over the longest span (since the pump signal travels in the opposite direction of the traffic-carrying signal). Although such a location of Raman amplifiers may be beneficial, other embodiments may use any other arrangement of Raman amplifiers or other types of amplification.

Figure 9:
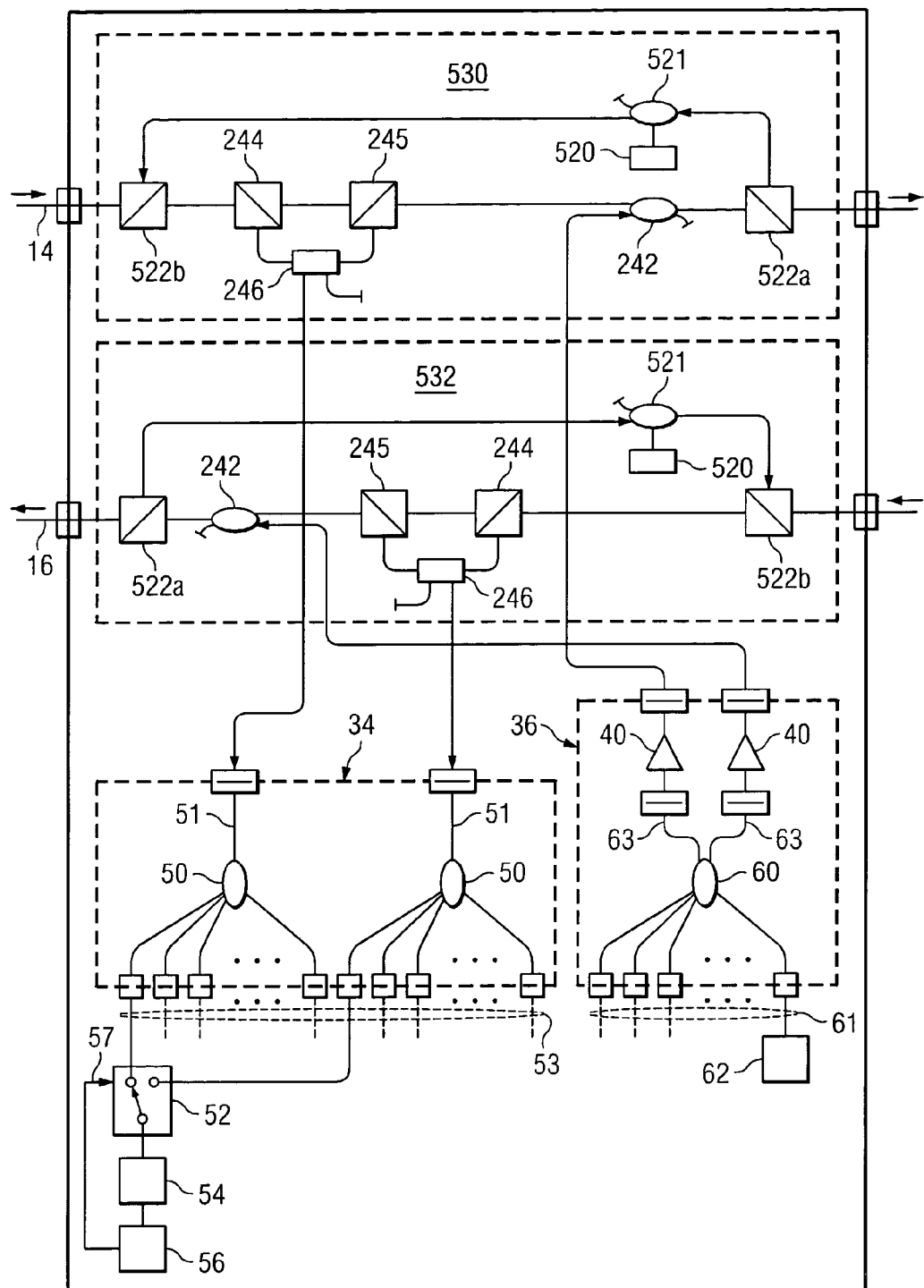
FIG. 9 is a block diagram illustrating details of an add/drop node having an amplification bypass in accordance with another embodiment of the present invention.

FIG. 9 is a block diagram illustrating details of an add/drop node 512 having an amplification bypass in accordance with another embodiment of the present invention. In the illustrated embodiment, node 512 includes the same components as node 212 illustrated in FIG. 6, except for particular components of transport elements 530 and 532. More specifically, as compared to transport elements 230 and 232 of node 212, transport elements 530 and 532 replace amplifier 40 with a Raman amplification bypass that comprises an amplification module 520, a coupler 521, and pump filters 522a and 522b. Amplification module 520 uses Raman amplification to amplify signals in a particular sub-band of wavelengths (or a portion of a sub-band). Amplification modules 520 may comprise Raman pumps. As described above, in the illustrated embodiment, Raman pump power is transmitted in a counter-rotational direction relative to the direction of the traffic-carrying signal. In other embodiments, pump power may be transmitted in the same direction as the traffic-carrying signal, or may be transmitted in both the same direction and in a counter-rotational direction.

Pump filters 522 may comprise WDM couplers or other suitable filters or elements operable to separate a pump power signal from a traffic-carrying signal. For the illustrated counter-rotational amplification, pump filters 522a filter the pump power from the signal and forward the pump power to amplification module 520 so that the pump power bypasses the add/drop elements of node 512. Pump filters 522b add the bypassed pump power back on to ring 14 or 16 (after possible addition of pump power for a particular sub-band by amplification module 520).

Amplification module 520 may include any suitable type of Raman pump, as are well-known to those of skill in the art. However, unlike previous uses of Raman pumps the assignment of particular sub-bands (or portions thereof) to particular nodes in a ring network allows for a unique distribution of the Raman amplifiers in the ring network. For example, a separate Raman pump may be installed for each sub-band (or for portions thereof) and thus each of these pumps may be installed at a location most suitable for that particular sub-band or portion thereof. Since each node 512 drops traffic in a particular sub-band or sub-band portion, the Raman pump 520 installed at each node 512 may be used to amplify the particular sub-band or sub-band portion assigned to that particular node 512. Using such an arrangement, each sub-band or sub-band portion may be amplified over the longest possible span. Although such a location of Raman amplifiers may be beneficial, other embodiments may use any other arrangement of Raman amplifiers or other types of amplification.

Although the present invention has been described with several embodiments, various changes and modifications may be suggested to one skilled in the art. It is intended that the present invention encompass such changes and modifications as fall within the scope of the appended claims.

What is claimed is:

1. A node for an optical network, comprising:
   at least one transport element operable to be coupled to the optical network, the transport element comprising an add/drop element comprising:
      a rejection filter operable to split an incoming signal that comprises traffic in a plurality of sub-bands into a first signal and a second signal, the first signal comprising the traffic in a first sub-band of traffic channels and the second signal comprising the traffic in the remaining sub-bands of traffic channels of the incoming signal;
      a bypass element operable to:
         receive the traffic in the first sub-band from the rejection filter;
         reject the traffic in a first portion of the first sub-band; and
         forward the traffic in a second portion of the first sub-band;
      an add element operable to:
         receive the second signal from the rejection filter without the second signal passing through the bypass element;
         receive the traffic in the second portion of the first sub-band from the bypass element; and
         combine the traffic in the second signal with the traffic in the second portion of the first sub-band for transport on the network; and
      a drop coupler operable to:
         drop a first copy of the incoming signal for communication of at least a portion thereof to one or more clients of the node; and
         forward a second copy of the incoming signal to the rejection filter.

2. The node of claim 1, wherein:
   the bypass element is further operable to:
      terminate the traffic in the rejected first portion of the first sub-band;
      receive add traffic in the first portion of the first sub-band; and
      combine the add traffic with the traffic in the second portion of the first sub-band; and
   the add element is further operable to:
      receive the combined traffic from the bypass element; and
      combine the traffic received from the bypass element with the traffic in the second signal for transport on the network.

3. The node of claim 1, further comprising a distributing element comprising:
   a splitter operable to make a plurality of copies of the first copy received from the drop coupler;
   one or more filters each operable to receive one of the plurality of copies and to forward one or more wavelengths of the received copy; and
   one or more transponders operable to receive each filtered wavelength from the one or more filters.

4. The node of claim 1, wherein the bypass element is operable to drop the traffic in the rejected first portion of the first sub-band for communication of at least a portion thereof to one or more clients of the node.

5. The node of claim 4, wherein the add/drop element further comprises an add coupler operable to:
   receive from the add element the combined traffic from the second signal and the second portion of the first sub-band;
   receive add traffic in the first portion of the first sub-band; and
   combine the add traffic and the traffic from the add element for transport on the network.

6. The node of claim 4, further comprising a distributing element comprising:
   a splitter operable to make a plurality of copies of the traffic in the first portion of the first sub-band received from the bypass element;
   one or more filters each operable to receive one of the plurality of copies and to forward one or more wavelengths of the received copy; and
   one or more transponders operable to receive each filtered wavelength from the one or more filters.

7. The node of claim 1, wherein the first portion and the second portion of the first sub-band are two separate, continuous bands of wavelengths of the first sub-band.

8. The node of claim 1, wherein the first portion and the second portion of the first sub-band are interleaved portions of the first sub-band.

9. The node of claim 1, wherein the add element comprises a passive optical coupler.

10. The node of claim 1, wherein the transport element further comprises a Raman amplification bypass comprising:
   a first pump filter operable to:
      separate Raman pump power from a traffic signal carried on the optical network;
      forward the traffic signal to the add/drop element as the incoming signal; and
      bypass the Raman pump power around the add/drop element; and
   a second pump filter operable to receive the bypassed Raman pump power and combine the Raman pump power with a traffic signal forwarded from the add/drop element.

11. The node of claim 10, wherein the Raman amplification bypass further comprises a Raman pump operable to add Raman pump power to amplify a particular portion of a sub-band of the traffic signal.

12. A method of transporting traffic on an optical ring, comprising:
   at one or more nodes coupled to the optical ring, dropping a first copy of an incoming signal for communication of at least a portion thereof to one or more clients of the node, the incoming signal comprising traffic in a plurality of sub-bands;
   forwarding a second copy of the incoming signal;
   splitting the second copy of the incoming signal into a first signal and a second signal, the first signal comprising the traffic in a first sub-band of traffic channels and the second signal comprising the traffic in the remaining sub-bands of traffic channels of the incoming signal;
   receiving the traffic in the first sub-band at a bypass element;
   rejecting the traffic in a first portion of the first sub-band at the bypass element;
   forwarding the traffic in a second portion of the first sub-band at the bypass element; and
   combining the traffic in the second signal with the traffic in the second portion of the first sub-band for transport on the network.

13. The method of claim 12, further comprising:
   terminating the traffic in the rejected first portion of the first sub-band at the bypass element;
   receiving add traffic in the first portion of the first sub-band at the bypass element;
   combining the add traffic in the first portion of the first sub-band with the traffic in the second portion of the first sub-band at the bypass element; and
   combining the add traffic in the first portion of the first sub-band and the traffic in the second portion of the first sub-band with the traffic in the second signal for transport on the network.

14. The method of claim 12, further comprising dropping the traffic in the rejected first portion of the first sub-band at the bypass element for communication of at least a portion thereof to one or more clients of the associated node.

15. The method of claim 12, wherein the first portion and the second portion of the first sub-band are two separate, continuous bands of wavelengths of the first sub-band.

16. The method of claim 12, wherein the first portion and the second portion of the first sub-band are interleaved portions of the first sub-band.

17. The method of claim 12, further comprising:
   at one or more nodes coupled to the optical ring, separating Raman pump power from a traffic signal carried on the optical network; and
   bypassing the Raman pump power around one or more components used to perform the steps of claim 12.

18. The method of claim 17, further comprising adding Raman pump power to the separated Raman pump power to amplify a particular portion of a sub-band of the traffic signal.

19. A node for an optical network, comprising:
   means for dropping a first copy of an incoming signal for communication of at least a portion thereof to one or more clients of the node, the incoming signal comprising traffic in a plurality of sub-bands;
   means for forwarding a second copy of the incoming signal;
   means for splitting the second copy of the incoming signal into a first signal and a second signal, the first signal comprising the traffic in a first sub-band of traffic channels and the second signal comprising the traffic in the remaining sub-bands of traffic channels of the incoming signal;
   bypass means for receiving the traffic in the first sub-band, for rejecting the traffic in a first portion of the first sub-band at the bypass element, and for forwarding the traffic in a second portion of the first sub-band at the bypass element; and
   means for combining the traffic in the second signal with the traffic in the second portion of the first sub-band for transport on the network.

* * * * *